April 22, 1930.  E. E. CLEMENT  1,755,980
RADIO BROADCAST DISTRIBUTING SYSTEM
Original Filed May 21, 1925   9 Sheets-Sheet 1
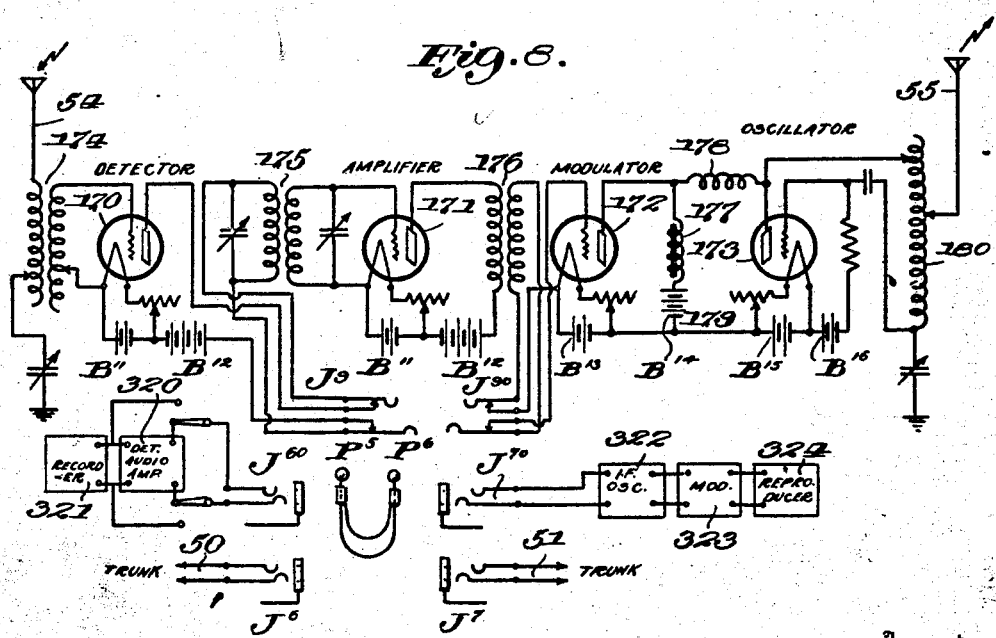

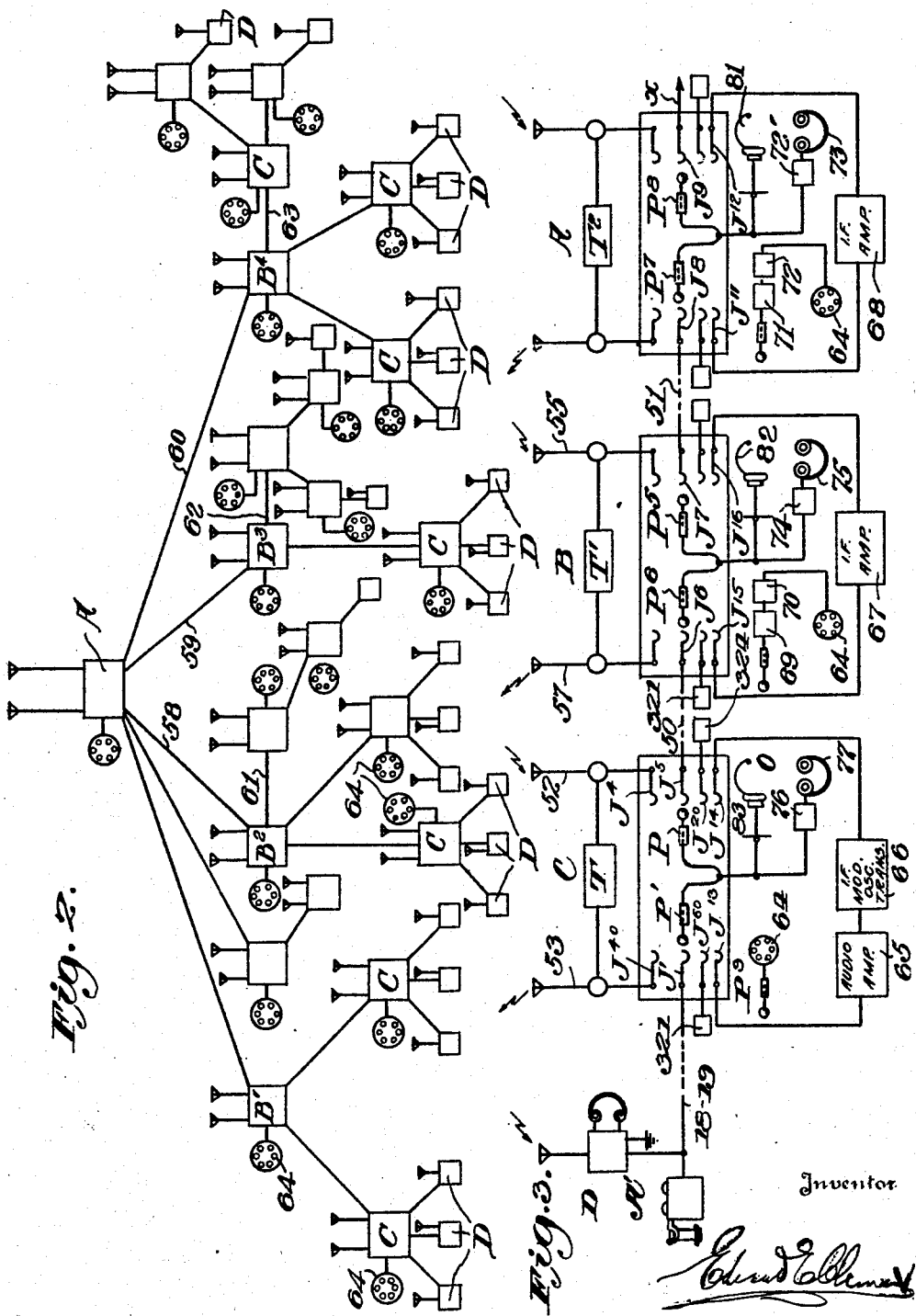

April 22, 1930.   E. E. CLEMENT   1,755,980
RADIO BROADCAST DISTRIBUTING SYSTEM
Original Filed May 21, 1925   9 Sheets-Sheet 3

Inventor
Edward E. Clement

April 22, 1930. E. E. CLEMENT 1,755,980
RADIO BROADCAST DISTRIBUTING SYSTEM
Original Filed May 21, 1925    9 Sheets-Sheet 4

Inventor
Edward E. Clement

April 22, 1930.   E. E. CLEMENT   1,755,980
RADIO BROADCAST DISTRIBUTING SYSTEM
Original Filed May 21, 1925   9 Sheets-Sheet 5

Inventor
Edward E Clement

April 22, 1930. E. E. CLEMENT 1,755,980
RADIO BROADCAST DISTRIBUTING SYSTEM
Original Filed May 21, 1925   9 Sheets-Sheet 6
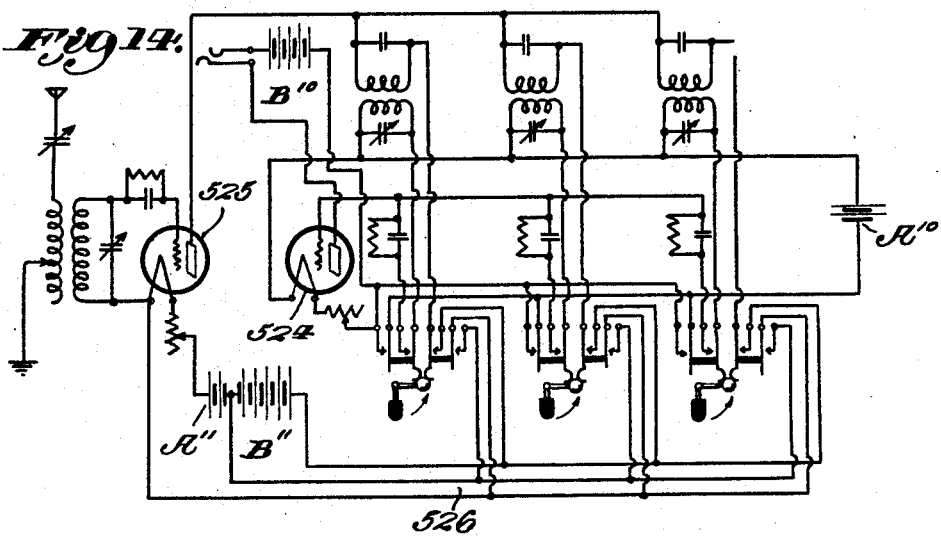
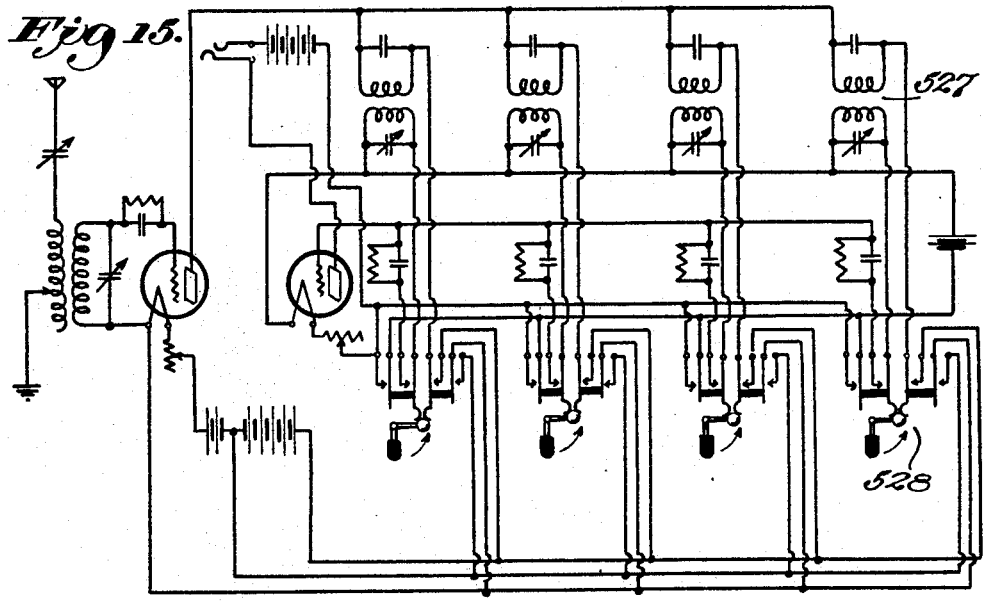
Inventor
Edward E. Clement

Inventor
Edward E. Clement

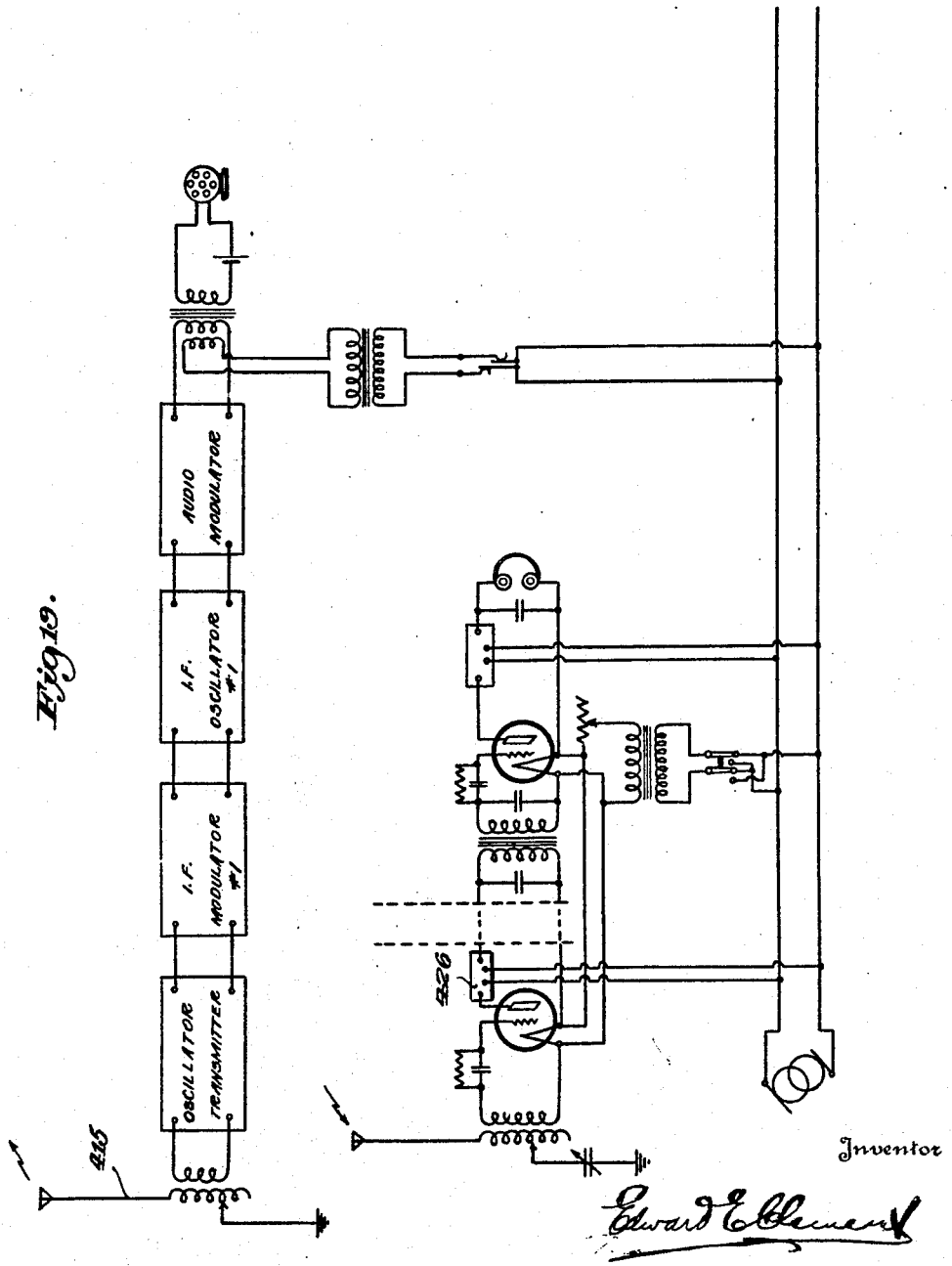

April 22, 1930. E. E. CLEMENT 1,755,980
RADIO BROADCAST DISTRIBUTING SYSTEM
Original Filed May 21, 1925    9 Sheets-Sheet 9
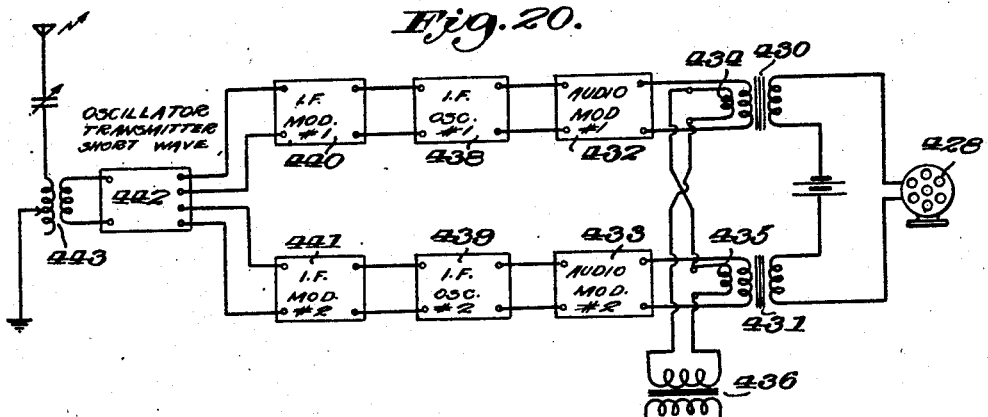
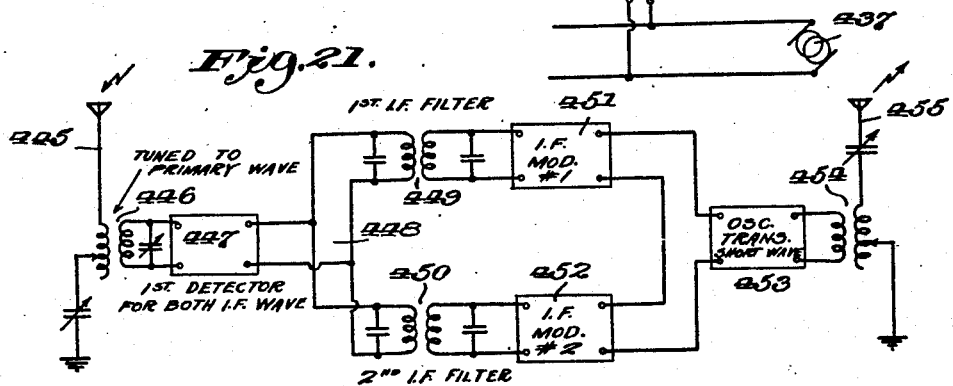
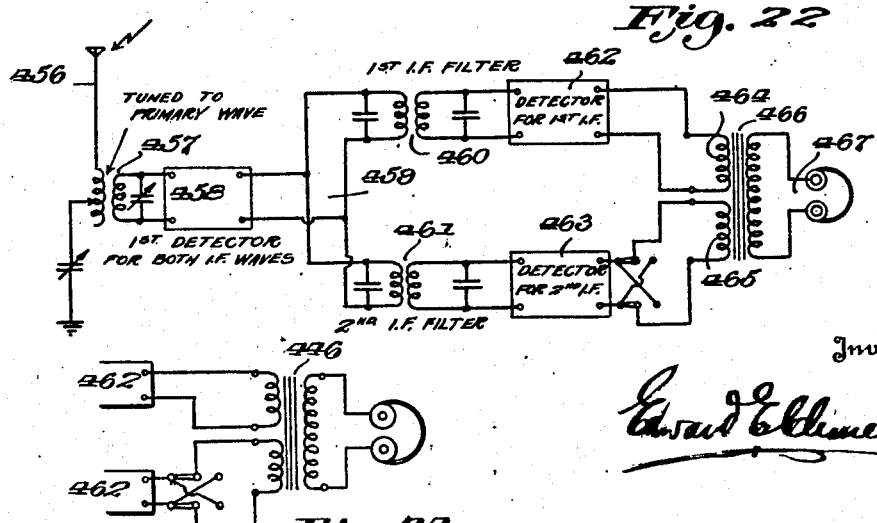
Inventor
Edward E. Clement Patented Apr. 22, 1930

1,755,980

UNITED STATES PATENT OFFICE

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA

RADIO BROADCAST DISTRIBUTING SYSTEM

Application filed May 21, 1925, Serial No. 31,928. Renewed June 8, 1927.

My invention relates to systems of radio broadcast distribution, and the present application is a continuation in part of my prior copending application, filed October 28, 1924, Serial No. 746,357, patented July 5, 1927, No. 1,635,153. This invention has for its object to provide an organization for the broadcasting of intelligence in which orderly distribution may be secured, with maximum efficiency. An important ancillary object is to gradually bring the entire radio distribution of intelligence under control without disturbance of commercial conditions which have been evolved during the rapid disorganized development of the art.

Very briefly stated, this system includes subdivision of the ultimate units or subscribers' stations into local groups in local areas, each group related to a local or regional distributing station; the grouping of these regional stations according to districts and relating each district group of regional stations to a district master station; the grouping of districts into divisions, which may conveniently coincide with the geographical standard time divisions of the country; and finally the relation of the district master stations to a central master station. There may be more intermediate steps or stations interposed between the subscriber's control or regional station and the central master station and there may be direct connection between the said regional stations and the central master station, but these possible variations will be apparent from the detailed description and do not change the principle involved. In any case, for purposes of distribution, the central master station broadcasts to the district master stations on divisional carrier wave frequencies, each of the district master stations broadcasts to its constituent regional central stations on a fixed carrier wave frequency, and each local or regional central station broadcasts to the subscribers in its local area on a common fixed carrier wave frequency.

Thus it will be apparent that the first characteristic feature of the system is that of sending from each center to the class or order of centers next above or below it, on a fixed carrier wave frequency or frequencies allotted permanently to said next higher or lower order of stations. If we call the central master station of the entire system, A, and call the district master stations B, the local or regional distributing stations C; and the subscribers' instruments in general D, then we may say that A transmits to B on B frequency, B transmits to C on C frequency, and C transmits to D on D frequency, of the respective carrier waves. For information that goes through from A to D, or that goes through from B to D, as well as information originating with C, original modulations are actually reproduced in the instruments at D, by means which will be described. The simplest way to do this is by double modulation, which also enables easy change of carrier wave frequency at the intermediate or relaying stations.

The reason for dividing the district stations into divisional groups is because of the change in time. Matters of great national importance may be broadcasted simultaneously over the entire country, even though they would be received at a late afternoon hour in the Pacific coast division, when it would be the middle of the evening in the eastern standard division. For regular broadcasting of programs, however, matter originating above the B or district stations by this system can be distributed at intervals of one hour in the divisions from eastern, through central and mountain to the Pacific coast. In other words, as standard time in each of these divisions changes one hour in going west, the same program of national interest, would be distributed from A to the four divisions simultaneously, but with an hour's interval between the same items. In the case of news items, and many classes of entertainments this can be done without recording and reproducing, but in the case of other matters it will involve recording the items first broadcasted and repeating the same at an hour interval in the succeeding time divisions.

For purposes of this distribution, the four divisional groups of the exchanges are given four distinctive carrier wave frequencies. Simultaneous broadcasting on all four may be going on at the same time, and it goes without saying that the same items may be distributed on all four by simultaneous modulation on the four carrier waves. The A, B and C broadcasting stations will all be equipped with tunable antenna circuits and receiving devices by which they can pick up modulated carrier waves of any frequency, and by this means the B stations in any division may get original matter being broadcasted in another division, but as a matter of administrative efficiency, this should only be by permission. One very strong reason for making the time division is that efficiency of transmission increases behind the daylight line, and any attempt to average times, except on special occasions, must result in a loss of efficiency due to this cause. It is to be understood that the grouping in four divisions however is only adopted for convenience, and may be varied as found convenient in practice.

By means that will be described, it is contemplated to have national district and local programs made up day by day, from which any subscribers may select. Selection is determined by frequencies, which by the use of double modulation may be frequencies of the envelope or intermediate wave transmitted. At present not more than five such frequencies will probably be required for this purpose, although many more are available in the present state of the art, and the number will probably be increased as development proceeds.

It will be noted from the description hereinafter that a geographical center is determined for the master station A, and this will probably have to be the most expensive and most elaborately equipped of all the transmitting centers. However, recent experiments have shown it possible to transmit over very long distances up to approximately 7,000 miles from low power stations, and the relay station of Hastings, Nebraska has easily reached Argentina. The longest distance involved in this system is approximately 1,200 miles for A transmission and not over 200 miles for B transmission, while the majority of the C stations will cover local areas not exceeding 10 or 15 miles in raidus. The national radio conference of 1923, held in the U. S. Department of Commerce, recommended the following ranges for broadcasting:

Government broadcasting stations, 600 miles;

Public broadcasting stations, 250 miles;

Private and toll broadcasting stations, 50 miles.

It also recommended that the same wave or overlapping wave bands be not assigned to stations within the following distances from one another, except that these distances may be lowered if the normal ranges of the station are correspondingly lowered:

Government broadcasting stations, 1,500 miles;

Public broadcasting stations, 750 miles;

Private and toll broadcasting stations, 150 miles.

According to this classification, there would only be one long distance station in this system, viz: the A or master station; while the district or B stations need have an extreme range of only one-third that allotted for public broadcasting stations; and the C stations would be well below the class limits of private and toll stations. This means that great flexibility can be obtained by the use of a small number of wave lengths for primary carrier waves as well as the intermediate waves produced by heterodyning or double modulation. Assuming four primary carrier wave frequencies to be assigned to the four standard time divisions, respectively, four other carrier wave frequencies may be assigned to each division for transmission from B stations to C stations, and if desired still other four frequencies to the C stations for transmission to subscribers. Inasmuch as the same four frequencies could be used throughout the entire country for district and local broadcasting, this would mean twelve carrier wave frequencies in all. In using double modulation, however, the number of primary carrier wave frequencies for pure radio transmission, may be reduced to four, viz: one common B frequency for receiving from A, one common C frequency for receiving from B and one common D or subscriber's frequency for receiving from C. In this case the initial broadcasting from station A to the four different divisions of the country would be on the same initial carrier wave frequency, modulated however with four different intermediate carrier wave frequencies, one of which is allotted to each of the four standard time divisions. In the same way the B or district stations may transmit to the C stations on the same initial carrier wave frequency, modulated with four intermediate carrier wave frequencies, which may or may not be the same as those transmitted from A. Similarly, the C station will transmit to the subscribers on one initial carrier wave frequency modulated with four or more intermediate carrier wave frequencies which are ultimately demodulated at the subscribers' stations to produce an audio message. If the A station transmits to the four divisions on four groups of intermediate frequencies, each division would have its own group of intermediate frequencies and would always receive that, but by having separately tuned local long wave circuits, it could also receive the intermediate frequencies intended for the other divisions, and thereby achieve two ends, viz: first, afford its divisional C stations and their subscribers the opportunity of selection between all the matter that will be broadcasted or has been broadcasted during the preceding or succeeding one, two or three hours, as well as that intended for immediate broadcasting in its own division; and second, repeat programs or items in the programs when desired, so that subscribers who have not had an opportunity of hearing some particular item may pick it up on the first, second or third repetition. For important items this power is a very valuable one, and will probably always be exercised in practice, even though the repititions of the particular items in the second, third, and fourth divisions may be reproductions from records made at the time of the first transmission or broadcasting in the first division. Of course there is a reverse progression to be considered also, in that items forming part of the regular program for the Pacific coast States, if to be heard in the same order in the eastern division or either of the intermediate divisions, would have to be either reproduced on the succeeding day, or produced in advance of their Pacific coast release, recorded and reproduced from the record in the coast division. As a matter of fact, the solution of this problem will probably lie in distributing a national program which will be varied in each division in passing through the B stations, to include matters of importance to that division only, and further modified in passing through the C stations (by authority from above) to include local items of special importance to the local areas.

In using the four frequencies referred to, reference is had to the usual manner of "checker boarding", with one frequency allotted to each square in the checker board, no two adjacent squares having the same frequency. This is not perfect because of the diagonal connection between squares, which would require more than four frequencies to overcome but if the figure be considered as a hexagon, it would be found that the entire area can be divided up separately on four frequencies or four bands without interference. This refers to primary carrier waves only, however, as selection and distribution by means of secondary or intermediate carrier wave modulation is not limited in fact to any particular distribution of the territory, but depends on the distribution among receiving stations of instruments for taking their own intermediate carrier wave frequencies and relaying them to the next lower order stations.

The great benefit of double modulation as will be hereinafter pointed out, is that a great range of selection can thereby be afforded any local station and any local exchange, which will be the same for all parts of the country and for every exchange down to the smallest hamlet, or the most distant station. In other words, every subscriber in this system may have access to the entire program available to any other subscriber without regard to location, distance, time or circumstances.

Instead of using double modulation for distributing the four groups of intermediate or long wave frequencies to the four different time divisions, wired trunks may be used between the master station and one or more of the B stations in the different time divisions, or a single wired trunk line connecting the A or master station with all the B stations in common, or a combination of the wire trunking with radio trunking through double modulation may be used.

My invention is illustrated in the accompanying drawings, in which

Fig. 1 is a geographical diagram of the area of the United States divided with respect to standard time, showing stations positioned to form part of a typical distributing system embodying this invention.

Fig. 2 is a graphical diagram showing the channels of distribution and lines of authority and control in the system of Fig. 1.

Fig. 3 is a circuit diagram of the same system shown in Figs. 1 and 2.

Fig. 8 is a similar circuit diagram of the apparatus shown in Figs. 5 and 6, which is the same in construction and arrangement, but differently tuned according to the station B or C, at which it is located.

Fig. 14 is a further modification of a subscriber's set using separate sets of batteries for each of the two tubes.

Fig. 15 is a modification of the receiving set of Fig. 14 using the fourth or special, adjustable filter circuit for the second detector.

Figures 16, 17, 18:
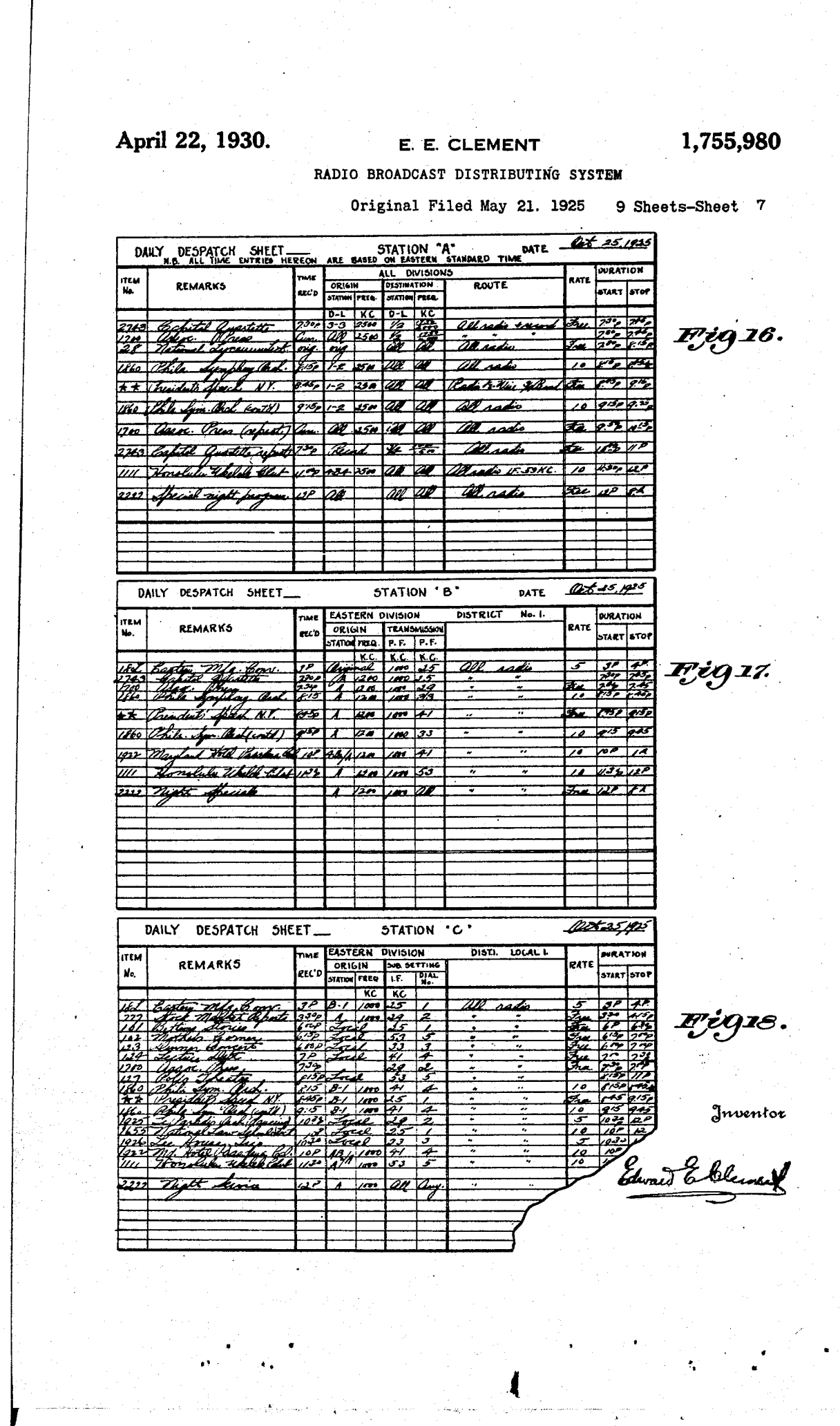

Figs. 16, 17 and 18 show the daily dispatch sheets for the master station, a B station, and a C station respectively.

Fig. 19 is a circuit diagram of a secrecy system.

Fig. 20 is a circuit diagram of another form of secrecy system transformer.

Fig. 21 is a circuit diagram of a relay to be used at the B and C stations for relaying from the system of Fig. 20.

Fig. 22 is a circuit diagram of a subscriber's receiving set for use in the system of Figs. 20 and 21.

Fig. 24 is a modification of part of Fig. 22 showing means for reversing the phase of one set of combined modulations.

Figure 4:
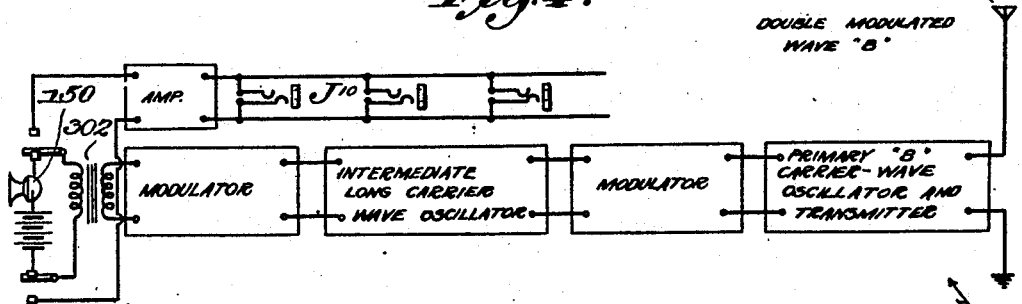
Fig. 4 shows symbolically an arrangement of double modulating and transmitting equipment at the A or master station of the system for matter original there.

Referring to the drawings, and particularly to Fig. 1, this is a diagram of the United States of America, divided by lines t, t', and t² into four divisions marked respectively "Eastern standard time," "Central time," "Mountain time," and "Pacific coast time." It happens that the town of Hutchinson, Kansas, is within fifty miles of the geographical center of the United States and hence I have shown this town with three rings around it, and the letter A, indicating the location either of the headquarters or master station of the entire system. In each division there is one station with two rings around it, and marked B°. These are the head or master district stations of the several divisions, which under certain conditions serve as relay stations between the A stations and the other B stations for their respective divisions. Other stations are shown in each division with one ring each, and marked B. These are district stations, and receive either directly from the A stations or on occasion by relaying from the head or master B stations in their respective divisions. This illustrates the general manner of distribution, and will be referred to hereinafter.

It is to be noted that Washington, D. C. is the head or master B station in the eastern division while other towns from Boston to Augusta, shown with one ring, are ordinary distributing centers each serving a number of local or regional centers around each of which are grouped subscribers. These local or regional centers are not shown on Fig. 1 but are indicated at C in Figs. 2 and 3. The designation of one of the district stations B as a head district station, is more on account of the necessity for regulation of the traffic over telephone trunks than from any necessities existing in the radio transmission scheme. The use of a long telephone trunk between every district station and the master station A might and probably would be impossible at some times, but the use of a single trunk particularly at night when radio distribution is the most active, would be possible at all times without interfering with telephone traffic. Such a trunk from Washington, D. C., to Hutchinson, Kansas, via St. Louis, or from Reno to Hutchinson via Denver, would be economical, while other district stations could be served by relatively short trunks through Washington, D. C. and Reno, St. Louis and Denver. It should be noted in passing, that I contemplate super-audio frequency modulated carrier current transmission, which has already been successfully employed on long distance trunk lines in ordinary telephone work. The same may be employed on all trunk lines for the telephone component of the complete transmission circuit. I shall also hereinafter describe as a modification of the main system of transmission the adustment of telephone trunks and radio apparatus so that the radio transmission and carrier current wire transmission can be used in alternate links back and forth. For example, A can transmit by radio to B, B by wire to C, and C by radio to D, who communicates back with C by wire, which in turn can communicate back to B by radio, and B with A by wire. Either the outgoing or return portion of this circuit may be used to the exclusion of the other portions.

In laying out the scheme developed in Figs. 1, 2 and 3, it is to be understood that no account has been taken of international receiving or transmission. While national or international signals might be picked up at any B station or even at any C station, it would be subversive of discipline to permit the same to be done without express authority and supervision from the master station A. International matters are all usually of national importance, and hence should be distributed in the first instance through the head station A. This means that relay stations East, West, North and South should be established to pick up short waves from abroad and relay the same on to Hutchinson or to other relay stations which would in turn repeat. I have deemed it unnecessary to illustrate or to describe in detail such relaying, because it has already been practiced in the art and as a matter of fact the station at Hastings, Nebraska, among others, was established primarily as a relay station. One advantage of the present organization resides in the fact that long distance relaying will practically be unnecessary because from whatever quarters matters for broadcasting are received, they can be picked up at A, B or C stations, and thence distributed over the entire system through the regular channels. It is not intended that such picking up, or in fact the operation of any portion of the system, shall be haphazard or at the discretion of outsiders. On the contrary, it is designed to make this system uncompromising in its adherence to program, national, divisional, district, and local, and under these heads each day's items will be fixed and determined not only with reference to the needs of the territory for which they are intended but also with respect to time of transmission and the nature of communications to be received from points within or without the system and forming a part thereof, including stations abroad. The importance of the master station A is apparent, since the maintenance of proper coordination demands that no departure from the regular routine be permitted without permission and provision therefor from the master station or headquarters A.

In Fig. 1 I have shown eight district stations B in the eastern division, ten in the central division, and six each in the mountain and Pacific coast divisions, or a total of thirty. This of course is illustrative only and not to be taken as final either in positioning or numerical selection. As a matter of fact if the area of the United States be divided up into substantially equal districts, approximately one hundred district stations B would be a convenient number, but it is doubtful whether the traffic would require this many district stations at first.

As will presently appear, the programs in each division will vary, both in substance and in time of release, hence it is necessary to have some positive method of differentiating between the broadcast carrier wave intended for each division and those intended for the others. While this may be accomplished in several ways, I prefer at present to use carrier waves of distinctive frequencies, one for each division. In the present state of the art, these may advantageously be very short waves, of the order of 3,000 kilocycles per second. The frequencies allotted to the B stations of the four divisions should be fixed and determinate, and known as division frequencies. Transmitting on these frequencies will ordinarily be from the A station, but under direction of the A station any B station may send on the B frequencies for special items or for relaying. If each division is thus given a distinctive frequency, four frequencies in all will have been allotted. In transmitting from the B stations in their respective districts either for relaying matter received from A, or for original matter, non-interference can be secured in a number of ways. The simplest of these is to allot different carrier wave frequencies to adjacent districts, so that no two adjacent B districts may have the same frequency. To secure non-interference between adjacent local exchange areas C, these also can be allotted different wave lengths for adjacent local areas. By this means, the system can be rendered flexible so that each district and each local C exchange can insert local matter in the broadcasting, without danger of overlapping. Assuming that this will require four frequencies for the B stations, four for the C stations and four for the D stations, a total of twelve frequencies would be required, which is well within the total number available, especially if very short waves are used for the primary transmission from A to B stations. It is to be understood that in merely distributing by relaying from A to B, from B to C, and from C to subscribers D, there could be no interference, as the same modulations originating at A would be repeated over the entire system. Also, it is to be understood that where different divisions or different districts or different local C stations are allotted different times on the program there can be no interference, even though the same carrier wave length be used for all of each order of stations.

Another method is to use double modulation with a plurality of intermediate frequencies modulated on the same carrier wave, so that selection of the modulated intermediate frequencies may be made, and so that at given times some or all of these intermediate frequencies may be employed for matter originating at B or C stations. For example, assume station A to broadcast to all stations B in all the divisions on the same short carrier wave. Assume that matters intended particularly for the eastern division are modulated on an intermediate wave of one frequency, those for the central division on an intermediate wave of a second frequency, those for the mountain division on a third intermediate frequency, and those for the Pacific coast division on a fourth intermediate frequency. The B stations would all be tuned as to their antenna circuits to the same carrier wave frequency, but their local circuits would be tuned selectively to the four different intermediate frequencies according to their location. Any B station in the central division would then take off the "Central" modulated intermediate frequency only, amplify and remodulate the same upon the C frequency for its district, and so on.

Reference will be made again to these methods of distribution after the apparatus and circuits shown in the drawings have been described in detail.

For the purposes of a basic description herein of the system as a whole, in the simplest form, I shall assume that each of the three orders of stations, B, C and D, is allotted a single carrier wave frequency for receiving, which is common to all the stations of the same order, and that say ten intermediate or long wave frequencies may be modulated thereon, each intermediate frequency being in turn modulated at audio frequencies intended for distribution. At certain times these ten intermediate frequencies may all be used at the master station A and broadcasted on the B carrier wave to all the B stations, which in turn will demodulate the initial carrier, amplify and reimpose the same intermediate frequencies and modulations on the common C carrier wave and so relay them to all the C stations, which in turn will demodulate the carrier waves received by them and reimpose the same upon the common carrier wave alotted to all the D or subscribers' stations. At other times there may be only one or two or even none of the intermediate frequencies in use by station A and at such times the unused intermediate frequencies may be allotted to different B stations or even to C stations for local or district broadcasting. In the first instance, it will be observed that the original modulations on all the intermediate frequencies are simply passed along by relaying until they reach the subscribers, who receive them in the original package, so to speak, so that it is entirely possible to say truthfully to the subscribers that they receive and actually hear the original audio modulations, with equal efficiency from all points, foreign or domestic; and this in spite of the simplicity of their instruments.

Referring to Fig. 2, the station A is shown connected by lines of distribution to district stations B', B², B³, and B⁴. The stations B' are in the eastern division, the stations B² in the central division, the stations B³ in the mountain division, and the stations B⁴ in the coast division. Each of these district stations is shown connected by lines of distribution to local distributing stations C in its district, and each of these local stations is shown connected to stations D typifying the ultimate subscribers' stations. The lines of distribution also represent telephone trunk lines from C stations to B stations, C represent the subscribers' telephone lines which either terminate in stations C (if they are identical with telephone exchange stations), or are connected thereto, as shown and described in my copending application, Serial No. 746,357, filed October 28, 1924, patented July 5, 1927, No. 1,635,153.

It will be noted that in Fig. 2 not all the stations B are connected to station A by direct individual trunk lines, but some district stations trunk through a district master station, thus economizing trunk lines. Thus, the trunks 58, 59 and 60 in Fig. 2 are shown extending to master district stations in the groups B², B³, and B⁴ respectively, other B stations in these district groups being connected to A through the respective master stations B by relatively short trunk lines 61, 62 and 63. The number and routing of trunks so used is of course variable, and may be accommodated to the necessities of telephone traffic so as not to interfere with the normal telephonic use of the wire plant, which is one of the cardinal points in the design of the present system.

A better idea of the general arrangement of circuits symbolized in Fig. 2 is conveyed by Fig. 3, wherein a subscriber's line 18—19 extends from his station D to the central telephone exchange C which is equipped with line jacks J', connecting plugs P—P' and trunk jacks $J^5$. From the trunk jack $J^5$, shown in the figure, a trunk line 50 extends to the district station B, which is also equipped with switchboard terminals including plugs $P^5$—$P^6$ and trunk jacks $J^6$, $J^7$. From the jack $J^7$ shown in the figure a trunk 51 extends to the master station A where it terminates on a jack $J^8$. The station is equipped with plugs $P^7$—$P^8$ and may be fully provided with telephone switching equipment, like the stations B and C. In Fig. 3 operators' telephone instruments are shown at O, connected in the usual manner to the cord circuit, and these symbolize a complete signaling and supervisory system. Each operator at stations B and A also has a demodulator and receiver for long IF waves, with suitable key for controlling the connection of the same to her cord circuits.

The radio equipment of station C includes a relay receiver and transmitter T. The antenna symbolized at 52 is supposed to receive waves sent out from the B station of the district in which the particular station C happens to be located, and to which it is connected by means of the trunk line 50, which of course does not symbolize all telephone trunks but only such as may be allotted for the so-called radio traffic. The frequency to which the antenna circuit 52 is tuned in that allotted to the C stations and to which they are all normally or permanently tuned. The antenna circuit 53 is for radiating modulated carrier waves to the subscribers D in the particular local area surrounding and served by the station C under consideration. The frequency to which the antenna 53 is tuned is that allotted to the subscribers D, and to which they are all normally or permanently tuned.

Obviously, performances, or news, or other items of varied character which it is desired to broadcast either locally or over this entire system may be picked up in any part of the same, and since it would be impossible to bring all artists, to, or to originate all matter at, the station A, there must be provision for ingathering as well as for distribuion, or, stated in another way, the system must be flexible enough to permit broadcasting from any part of it. It may be assumed therefor, without attempting to arbitrarily settle details of ultimate practice, that all studio and other connections for broadcasting, should initially be made through a C station. Theoretically any subscriber's station having a telephone transmitter may thus become a broadcasting station. Practically, while the subscribers' stations may be used as pickups, regular studio work will probably always be done either through PBX boards with special equipment, or in other special stations connected with a C central station. All of these may be taken as symbolized by the station D or A' in Fig. 3. It should be noted in passing that this allocation or original modulation to C stations does not interfere with direct broadcasting from A or B stations, since each of these can most conveniently be located at and operated in conjunction with a telephone central exchange which is also a C station or has a C station connected to it. Thus in Fig. 2 I have shown a microphone transmitter 64 at every station of the orders A, B and C, to indicate that broadcasting may be originated thereat when required. The actual manner in which this is now intended to be done is shown in Fig. 3. The symbolic station C is provided with a pair of jacks $J^{13}$ and $J^{14}$ between which are connected the audio amplifier 65 and the intermediate frequency modulator and oscillator transmitter 66. The jacks $J^{13}$ and $J^{14}$ may be connected through the operator's cords and plugs with the line jack J' on the one hand and with either one of the jacks $J^4$ or $J^5$ on the other. If jacks $J^8$ and $J^{13}$ are plugged together and jacks $J^4$ and $J^{14}$ are plugged together, then the operation would be as follows: Assuming the subscriber A' to transmit sound waves electrically over his line 18—19, these waves pass into the audio amplifier 65 and thence into the modulator 66, whereby a modulated intermediate frequency carrier wave is communicated to the input side of the relay transmitter T, which in turn modulates the long wave thus produced upon the short carrier wave allotted to stations D, and radiates the same from the antenna 53. Thus the station C is broadcasting on the common frequency wave, using an intermediate frequency which the subscribers can receive by double demodulation, in a manner to be presently described.

Now assume that instead of jacks $J^4$ and $J^{14}$ being plugged up together, the jacks $J^5$ and $J^{14}$ are so connected. The result will be as follows: The audio waves over line 18—19 pass to the audio amplifier 65 and thence to the modulator and oscillator transmitter 66, by means of which an audio modulated intermediate frequency carrier current is transmitted over the trunk line 50 to the station B. At this station an arrangement of jacks is encountered similar to that at station C. Jacks $J^{15}$ and $J^{16}$ have connected between them an intermediate frequency or carrier amplifier 67 which may be plugged up either for broadcasting from the antenna 55, or for continued transmission over the trunk 51 to the station A. To produce the first result, jacks $J^6$ and $J^{15}$ are plugged together and jacks $J^9$ and $J^{16}$ are plugged together, whereupon the carrier current or intermediate frequency carrier waves will be communicated to the input circuit of the oscillator transmitter B and thereby modulated on a high frequency carrier wave radiated from the antenna 55, at standard C frequency. This wave will be received and may be relayed by all the C stations within range of the transmitting station B. If wider distribution be desired the jack $J^{16}$ is plugged onto the jack $J^7$ of the trunk line 51, and the amplified or relayed intermediate frequency carrier waves are transmitted to the station A. Here the arrangement of the intermediate amplifier 68 between the jacks $J^{11}$ and $J^{12}$ is the same as that of the amplifier 67 at station B. By plugging up the jack $J^{12}$ to the jack $J^{10}$, the amplified intermediate frequency waves will be communicated to the input side of the oscillator transmitter $T^2$ and thereby modulated on a short carrier wave and radiated from the antenna 57. As this wave has a frequency allotted to the B stations, all the B stations will receive it, and may in turn relay it to the C stations and they in turn relay it to their subscribers. One reason for the rule that all broadcast matters shall originate at or through a C station will now be apparent, viz, that the initial audio or telephone waves may be changed as near as possible to the point of origin to modulated intermediate frequency carrier waves, which may then be imposed as modulations on a radiated carrier, or on a wire circuit, with equal efficiency. Audio waves in a wire circuit are subject to attenuation and distortion to a greater degree than modulated superaudio frequency carrier waves. Also, by using superaudio frequency currents on the trunk lines, advantage can be taken of the well established system of multiplexing and relaying already in use, and the trunks rendered more productive without interfering with their telephonic use. Thus, the initial audio waves are always changed into modulated superaudio waves at the nearest central station, and thence dispatched either on a carrier wave radiated from an antenna, or on a trunk wire to some other point where they are so dispatched. In order to add still further to the flexibility of the system, the A station at the right of Figure 3 may trunk as from a jack or jacks $J^{12}$ through a trunk or trunks designated as X to any other part of the system, as for example to a particular B station, where the trunk X may terminate on a jack similar to $J^6$, for connection to radio transmitter T', or by further trunking to some particular C station, and so to the radio transmitter T at such station, whereby matter can be picked up at any point and broadcast either generally or in a selected district or in a selected local area only. It follows also from this arrangement that when radio transmission is difficult over long distances or in any particular section of the system, due to seasonal or diurnal or non-periodic phenomena, the distribution by wire can be made to supplement distribution by pure radio and the average of efficiency maintained throughout the system. To accomplish this every part of the system must cooperate perfectly with all other parts as determined by the master control station A and district master control stations B, B', etc. both in time of transmission and maintenance of clear transmission channels. Such coordination may be compared to the system of train-dispatching on a railway system, and involves the use of interlocking records and time sheets, for A, B and C stations, and the management and dispatching of all radio traffic by a regular traffic force trained for that purpose. To fully understand this idea, the operating organization must be considered for a moment. First it must be taken into account that this system does not contemplate uncompensated or irregular use of telephone trunks and wire plant, but on the contrary is based on the assumption that the telephone companies, by contract or otherwise, will have a participating interest in all earnings of the radio broadcasting system, if they do not collectively act to operate it. The use of all wires and switching equipment will therefore be paid for, and the cost of the service with a suitable profit will be distributed over the entire body of subscribers, and regularly collected by the local central station authorities by flat rentals or toll charges, both of which are herein provided for.

Again referring to Fig. 3, it will be observed that station C as well as stations A and B are indicated as having originating modulators (shown as microphones) 64, which may be plugged onto either the input side of the respective radio broadcast transmitters T, T', and T² or the respective trunks 50, 51, and $x$. At station C the modulating audio transmitter can be operatively connected to either jack J⁴ or J⁵ by inserting plug P⁹ in the jack J¹³ of the amplifier 65 and long wave modulator and oscillator 66, and then plugging jack J¹⁴ to either of the other jacks at will. The parts 65 and 66 are here made separate units because they are common to all subscribers' lines as well as the operator's microphone circuit. At station B the operator's microphone is connected to plug P¹⁰ through amplifier 69 and long wave modulator and oscillator transmitter 70; and at station A the operator's microphone 64 is connected to plug P¹¹ through amplifier 71 and modulator and oscillator transmitter 72. At station B the trunks 50 bring in modulated intermediate frequency (IF) waves or carrier current, and in passing this to either transmitter T' or trunk wire 51, only amplification is needed, which is supplied by unit 67, which may be a vacuum tube relay as well as amplifier unit. Similarly at station A the trunks 51 from B stations bring in carrier current or (IF) waves, and the relay and amplifier unit 68 is provided accordingly. Finally, to enable full supervision as well as reception of audio at each station A, B, and C, the operators' end circuits are indicated as provided with demodulators 72, 74, and 76, and receiving telephones 73, 75, and 77 respectively. These are supposed to be connected to the cords through listening keys 78, 79, and 80, respectively, which may also control the connection of ordinary operators' telephones 81, 82, and 83, respectively, for telephone conversation over cords, trunks and lines as usual.

It will be understood that Figs. 2 and 3 are merely outlines or skeleton diagrams, in which the metallic lines and trunk circuits with all their minutiæ of line and cut off relays, etc. are presented by single lines, and the subscribers' and central office apparatus is all indicated by elementary symbols; but are intended to represent fully developed and equipped standard lines and stations. It may also be noted here that for simplicity of description and illustration I have purposely shown manual rather than automatic telephone switching apparatus at the exchange centers, but for the attainment of every purpose and the performance of every function in my system which is herein shown attained or performed by manual apparatus, I contemplate as well the use of the corresponding automatic apparatus, as will be further explained hereinafter.

Referring now to Figs. 4 to 7 inclusive, I have therein shown the arrangement of receiving and transmitting apparatus at the stations A, B, C, and D of Figs. 1, 2, and 3. More particularly, these figures constitute a connecting link between Fig. 3 which is merely a skeleton, and the detail circuit figures which follow hereafter. Turning to Fig. 4, I have shown therein an arrangement of originating broadcast transmitters at the head or master station A. The purpose is double modulation, by first modulating by means of a telephone transmitter upon a long wave, and then modulating the long wave upon a short carrier wave of suitable frequency to be received at the stations B. It goes without saying, that this same arrangement of apparatus will be found at each of the other central stations B and C, being indicated in Fig. 3 by the numeral 64. In order that this apparatus may also be employed for radio broadcasting of material brought into the stations over wired trunks, I show a jack J¹⁰ (see right hand end of Fig. 3) connected through an amplifier to switch contacts which may be connected through amplifier switch arms to the primary of the transmitter induction coil 302, the secondary of which is connected to the modulator of the generating and transmitting set. Thus a trunk line or even a subscriber's wire may be plugged on to the modulator through the amplifier by means of jack $J^{10}$.

Figure 5:
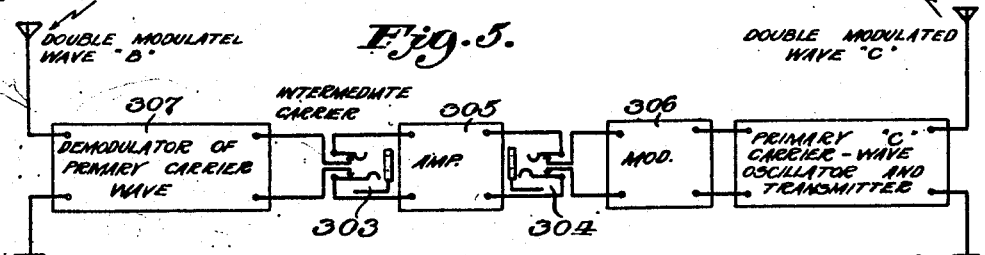
Fig. 5 shows symbolically equipment for the B stations, by means of which the primary carrier waves transmitted from the apparatus of Fig. 4 may be demodulated and the intermediate frequency waves or envelope modulated upon a new carrier wave C.
Figure 6:
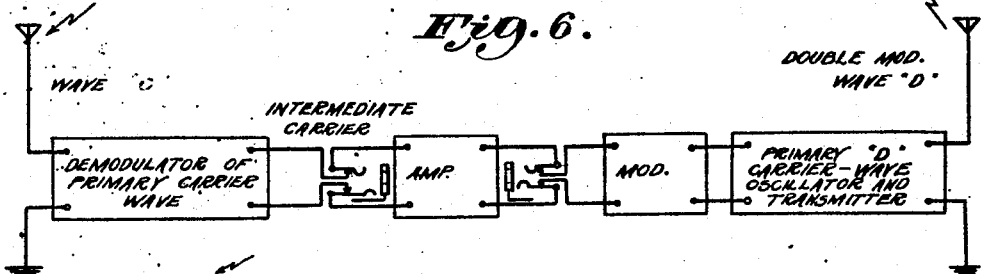
Fig. 6 shows symbolically apparatus similar to that in Fig. 5, but intended to be located at the local or regional distributing stations C, receiving, therefore, on the C wave frequency, transmitting on the D or subscriber's frequency.

Fig. 5 shows a relay apparatus primarily intended for use at stations B and C, but which will also be used at master station A. Fig. 6 shows identical apparatus, except for the jacks 303 and 304, the purpose of which will be presently explained. These jacks can be used in the circuit of Fig. 6 if desired.

The function of the apparatus of Fig. 5 is to take double modulated waves at the frequency allotted to the receiving station, demodulate the short wave carrier so as to produce modulated intermediate frequency waves which are then passed through a tuned amplifier 305 to a modulator 306, by means of which they are modulated on a primary or short wave carrier of a frequency suitable for the next lower order of receiving stations, in this case C stations. The short waves thus modulated are then radiated.

By means of the jack 303, intermediate frequency or long waves modulated may be taken off a trunk and passed through the amplifier 305 to the modulator 306 and thence radiated as before. Also, by means of the jack 304 intermediate frequency or long waves modulated which have passed through the demodulator 307 and the amplifier 305 may be forthwith placed upon the wire trunk lines for transmission to other stations. These extensions should be available at each stage in the system, and I consider it original with me to provide means for effecting these combinations of super-audio frequency modulated waves transmitted either from wires to radio carrier or from radio carrier to wires without change either in the intermediate frequency waves or in their modulations, and shall claim the same accordingly. This is one essential feature of the present system, which it is believed should be adhered to in any system of organized broadcasting, i. e. that when an original modulation is once made, the wave train carrying that molulation should be preserved unchanged throughout its entire course from point of origin to the listener's ears. As described herein, I accomplish this by means of double modulation, with super-audio modulated waves modulated upon the high frequency radio carrier. I shall presently show that single modulated waves can be received and relayed with the same ultimate effect. I consider, however, that the method of double modulation is the best and most perfect for this purpose.

Figure 7:
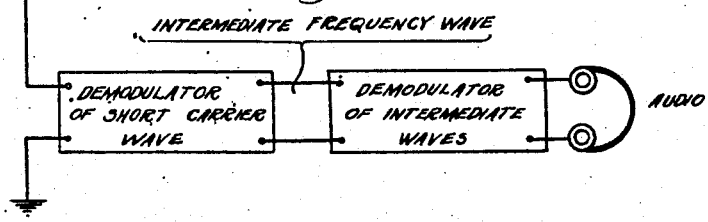
Fig. 7 shows symbolically a subscriber's set adapted to receive on the D frequency, to demodulate the short carrier wave, and then to demodulate the intermediate frequency carrier wave, so as to produce audio waves as its output.

Referring to Fig. 7, this shows typically a subscriber's apparatus for taking double modulated waves sent out from the stations of any of the preceding three figures, and demodulating the same so as to recover the original audio modulations and make them apparent. There are two units, one a demodulator of the short carrier wave, which produces the long intermediate frequency wave carrying the original audio modulations, and passes these to the second demodulator, which demodulates the intermediate waves and passes the audio waves to the telephone receiver shown at the right of the figure. This method is shown in detail in my copending application referred to above, where the circuit arrangement of such a double demodulator is illustrated in full.

The apparatus shown in Figs. 5 and 6, is intended to receive a double modulated carrier wave such as that radiated from the antenna in Fig. 4, demodulates the same and reimpose the long wave or intermediate frequency, with its modulations, upon another short wave carrier which in the apparatus of Fig. 5 is supposed to be the carrier wave of a frequency allocated to stations C, while in the apparatus of Fig. 6 this is supposed to be the carrier wave of a frequency allocated to the subscriber's stations D. Glancing at the four figures, 4, 5, 6 and 7, it will be observed that from the original modulation due to the transmitter 150 to the final demodulation by the intermediate wave demodulator in Fig. 7, the same intermediate long wave carrier, and the same audio modulations thereof, are maintained intact and unmodified, being merely passed along by relaying from station to station on short carrier waves, or as equivalent of the carrier waves.

The apparatus in Fig. 5 and that in Fig. 6 is identical except for the tuning of the transmitted carrier wave. The description of one therefore will suffice for both.

Referring to Fig. 8, which is a detailed circuit applicable to both these figures, 54 is the receiving antenna coupled at 174 to the grid circuit of the detector 170, whose plate circuit is connected through a tuned filter coupler 175 to the grid circuit of the amplifier tube 171, whose plate circuit is connected through the transformer 176 to the grid circuit of the modulator tube 172, which in turn has the usual Heising connections 178—179 to the circuit of the oscillator tube 173; the radio choke coil 178, the power battery $B^{14}$ and the magnetic choke coil 177 being arranged as usual. The grid and plate of the oscillator tube 173 are connected to the antenna inductance coil 180, which with the usual tuning condenser $180^a$ is included in the antenna circuit 55. Filament batteries $B^{11}$, $B^{13}$, and $B^{15}$, and plate batteries $B^{12}$ and $B^{16}$ are located as usual. As thus described, the assemblage constitutes a relay set which will take in the modulated long waves on a short wave carrier, and retransmit them on a carrier of different frequency, without demodulating or disturbing the modulations of the intermediate or long wave. In order that these long waves may be transferred from the first detector circuit to trunks or to recording devices, and in order that modulated long waves brought in by trunks or produced by reproductions of records, may be placed on the radiating antenna 55, I provide connections symbolized as jacks $J^9$—$J^{90}$. The jack $J^9$ has its springs connected to the terminals of the coupler 175, and these springs normally rest upon contacts in the plate circuit of the tube 170. The jack $J^{90}$ has its springs connected to the terminal of the coupler 176, and these springs normally rest on contacts connected in the grid circuit of the modulator tube 172. Trunks such as 50 and 51 terminate on jacks $J^6$ and $J^7$, (see Fig. 3), adapted to be interconnected with each other or with the jacks $J^9$ and $J^{90}$ by plugs and cords as indicated at $P^5$ and $P^6$. By plugging either one of the trunk jacks $J^6$ or $J^7$ onto jack $J^9$, the corresponding trunk line will be connected to the tuned filter coupler 175, whose windings are simultaneously disconnected from the detector tube 170. Thus modulated carrier current at the same frequency as the intermediate waves used in the radio side of the system, will come over the trunk line 50, for example, through the jacks $J^6$ and $J^9$ and plugs $P^5$ and $P^6$, and so to the coil 175, whence the long waves will pass to the grid circuit of the amplifier tube 171, to be amplified and then sent through the modulator and oscillator circuits of tubes 172 and 173. Any incoming trunk material can in this way be put "on the air" at any station having the relay apparatus of Fig. 8 or the equivalent thereof. For reverse operation, by plugging either one of the trunk jacks $J^6$ or $J^7$ on to the jack $J^{90}$, the corresponding trunk, as 57 for example, becomes connected through plug $P^6$ and plug $P^5$ to plug $J^{90}$ and therethrough to the coil 176, whose primary winding is simultaneously disconnected from the grid circuit of the modulator tube 172. The incoming modulated short carrier waves received on the antenna 54 will pass through the detector 170 and by demodulation of the primary carrier long intermediate frequency waves will be passed through the filter coupler 175, amplified by the tube 171, and so communicated through the coupler 176 to the cord circuit and jacks, directly to the trunk line 51. In this way, material can be taken "off the air" at any time and put on the trunks by simply obliterating the primary carrier wave. It is to be understood that by varying the tuning of the couplers, long waves of any frequency can be taken from or fed onto the trunks.

It has been pointed out hereinbefore that for proper coordination between the four time divisions of our country, there must be repetition of at least some portions of the general program, at intervals of one, so as to allow for the elapsed time between the same clock hours in any two successive divisions. There are many items on a radio program that can very advantageously be recorded and released thereafter. Among these are news items, some musical programs and the like. It is also pointed out that an advantage inheres in this repetition over different parts of the system, in that there are multiplied chances of subscribers in any divisions receiving items which they have missed during previous broadcasting. Circuit arrangements for rendering this method of recording practical are shown in Fig. 8, symbolically. Jacks $J^{60}$ and $J^{70}$ are provided for the recording and reproducing apparatus respectively. $J^{60}$ is connected to a unit 320 containing a detector and audio amplifier, the output side of which is connected to a second unit 321 containing a recorder. As a modification of this arrangement, the detector feed may be omitted from unit 320 and the audio amplifier be replaced by an amplifier adapted for the intermediate or long wave frequencies. The recorder 321, which may be a light recorder operating photographically, a mechanical shutter device, or of any other desired type, including the cut record apparatus of the Victor Phonograph Company, will then record the long secondary waves with the audio modulations on them. While this requires delicate apparatus and parts having a high natural period, it is pointed out that these long waves are usually for expediency brought down as low in frequency as possible above the audio range, and that satisfactory records can be made by any of the methods mentioned, especially the photographic method, throughout the entire audio range and above it. Thus, either the audio modulations off the long waves, or the long waves themselves stripped off the primary carrier or taken over the trunks, may be recorded by the units 321. According to late practice, which is unnecessary to describe in detail, such a record is made by means of photographing on a ribbon which can be of any desired length, so that considerable portions or all of the programs may be preserved and repeated when desired.

The jack $J^{70}$ is connected to the output terminal of unit 322 containing an intermediate frequency or long wave oscillator, having its input terminals connected to a modulator 323 connected in turn to the reproducer 324 of the record previously made by the unit 321. These units are all shown as squares, in symbolic fashion as no claim is made to the details of their construction or operation, which are well understood in the art. It will now be noted that a record having been made, can be placed in the reproducer 324 which will work the modulator 323 in conjunction with the long wave oscillator 322, so as to produce intermediate frequency or long carrier waves modulated with the original audio modulations carried by the record. These long waves may be placed as carrier current upon the trunk lines, or by connecting the jacks $J^{70}$ and $J^9$, they will pass through the filter coupler 175 to the amplifier 171, the modulator 172, and the oscillator 173, and so be modulated upon a short carrier wave which is then radiated from the antenna 55. It is to be specially marked that the apparatus of Fig. 8 can be located to advantage either at a transmitting B station, or at a receiving B station for deferred transmission. The latter is at present considered preferable. Suppose for example, that the master B station for division one (eastern standard time) is broadcasting a Philharmonic concert. This is timed for eight o'clock, and as it is received at the master B station for division two, it is only seven o'clock, and when received for division three, it is six o'clock, and in division four, it is five o'clock. We may assume that division two picks up the primary waves, on an antenna such as 54, and by plugging from jack $J^{90}$ to the jack $J^{60}$, amplifies, detects again, and records audio modulations. One hour later, this record is placed in the machine 324, and the jack $J^{70}$ is plugged up to the jack $J^9$, whereupon the record is reproduced, operates the modulator 323 and the oscillator 322, sends long waves through the filter coupler 175, the amplifier 171, and the coupler 175 to the high frequency modulator oscillator 172, 173, thus modulating the reproduced waves on a short wave carrier which is finally radiated from the antenna 55. Thus, the mechanism shown in Fig. 8 contains within itself all the elements necessary for instantaneous or deferred relaying; for transfer from the receiving antenna to a trunk or trunks, of modulated superaudio carrier current; for transfer of modulated superaudio carrier current or waves from a trunk or trunks by modulation on to a short carrier wave, to the antenna 55 for radiation; for transfer from trunk to trunk between the stations of audio or superaudio modulated waves or carrier current; for detecting and recording matter received by radio over the antenna 54; for receiving and recording matter received by the carrier current over any of the trunks; and for reproducing and transmitting by pure radio or over trunks matters previously received and recorded. It will be understood of course that the mechanism and circuits described are typical only, and in this specific form are used for purposes of definition and not of limitation. Thus, many different arrangements of tubes, the multiplication of units in amplifiers and the like, and the multiplication of units as a whole so that separate sets can be used for recording and trunking and the like, are possible, and all such arrangements and modifications are to be understood as within the scope of my invention. I consider the arrangement and combinations shown in Fig. 8 to be new and original with me and shall claim the same accordingly.

Referring to Fig. 3 in passing, and in connection with the description of Fig. 8 it is to be noted that the recorder and reproducer are indicated in Fig. 3 at 321 and 324 with terminal jacks $J^{60}$ and $J^{70}$ respectively.

The general operation of the system thus described will now be understood. The main underlying idea is that of a mixed wire and radio system organized so that the characteristic properties of each of these elements are utilized in the combination to the best advantage, and defects and disadvantages of either are eliminated. According to the principle laid down in my prior Patent No. 1,522,357, pure radio transmission is used for the broadcasting from center to scattered units, and wire transmission from units to center; but this is expanded by successive steps of relay distribution outward, and selection inward, so as to cover a large area such as that of the United States, in which not only are successive steps in distribution necessary, but divisions of the territory according to time become important.

Since this is a double modulation system, specifically, we are afforded the opportunity of multiplying intermediate or long wave frequencies on the several primary wave carriers. Thus, A may transmit from the same or several machines, all tuned to the same primary carrier wave, which may be for example, one hundred meters, for the eastern division. These several intermediate wave lengths are filtered out at the B stations after detecting and rectifying the primary carrier wave; and each relay station may have as many of these filter coupler circuits of the type shown in Fig. 8, as there are intermediate frequencies to select from. Various combinations of primary frequencies and intermediate or secondary frequencies can be employed for enabling selection to be made, and the number of simultaneous electric programs that can be put out by any one of the three stations A, B, and C is limited only by the number of transmitters with which they are equipped, and the number of intermediate frequencies available to which they are respectively tuned.

It is of course understood that any or all of the details, construction and operation thus outlined may be changed and modified as necessity, convenience, and the resources of the art from time to time may dictate or permit, without departing from the scope and purview of my invention. I believe I have disclosed a complete and operative system for the purposes described, which is novel in totally, as well as in its several divisions and parts, and that the methods employed throughout are novel. when considered in an organized system. I do not claim the specific circuits shown except as hereinbefore stated, but I do claim the system of the parts and the method of operating the same, as herein disclosed and I wish it distinctly understood that I contemplate all non-essential changes and modifications which may be made therein.

While the master station has been described as being located near the geographical center of the system, it may be permanently or at times located in any division, for example, at New York in the eastern division, controlling other divisions by wire or by radio relaying repeated from division to division. The master station, wherever located, is for the time being the center of the system.

Figure 9:
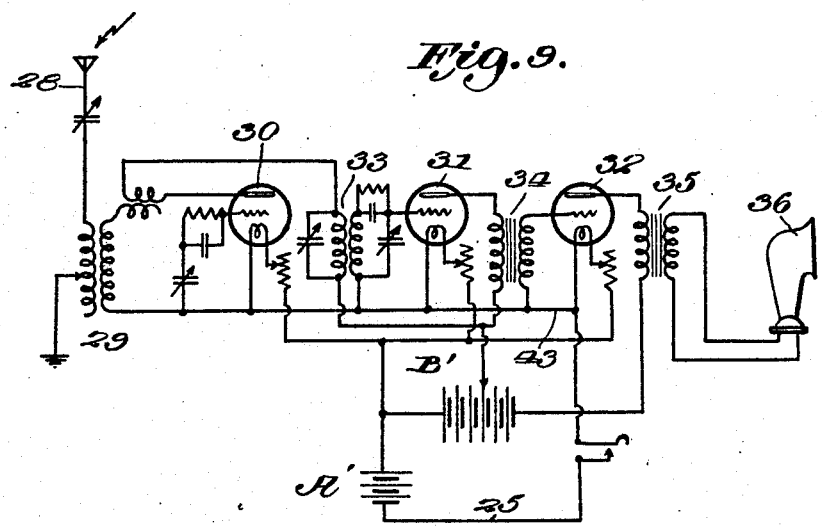
Fig. 9 is a circuit diagram of a subscriber's receiving set arranged for selection through double modulation.

A simple form of circuit arrangement for the subscriber's receiving set symbolized in Fig. 7, is that shown in Fig. 9. This comprises a receiving antenna 28 coupled to the input circuit of a detector tube 30 tuned to the primary wave and a second detector tube 31 having its input circuit coupled through a filter coupler 33 to the output or plate circuit of the first detector 30, the filter coupler 33 being tuned to the desired intermediate frequency of which there are several, preferably four, carried by the primary wave. To afford the subscriber selection of one of several programs, the filter coupler 33 is arranged to be tuned to the different intermediate frequencies. In the interest of simplicity of control and uniformity of service, it is desirable to transmit and receive one standard primary frequency to which the input circuit of the first detector 30 may be set in tune, but where greater variety and flexibility are desired, the broadcasting may be done on several primary carrier waves of different wave lengths, each carrier being modulated with several intermediate frequency waves. The second detector 31 of the subscriber's set has its output circuit coupled through an audio transformer 34 to the input circuit of an amplifier tube 32 whose output circuit is coupled through a transformer 35 to a loud speaker 36. The usual "A" and "B" batteries are provided as indicated at $A_1$ and $B_1$, respectively, the "A" battery lead 25 being connected to the filament bus 43 through a filament switch $h$.

Figure 10:
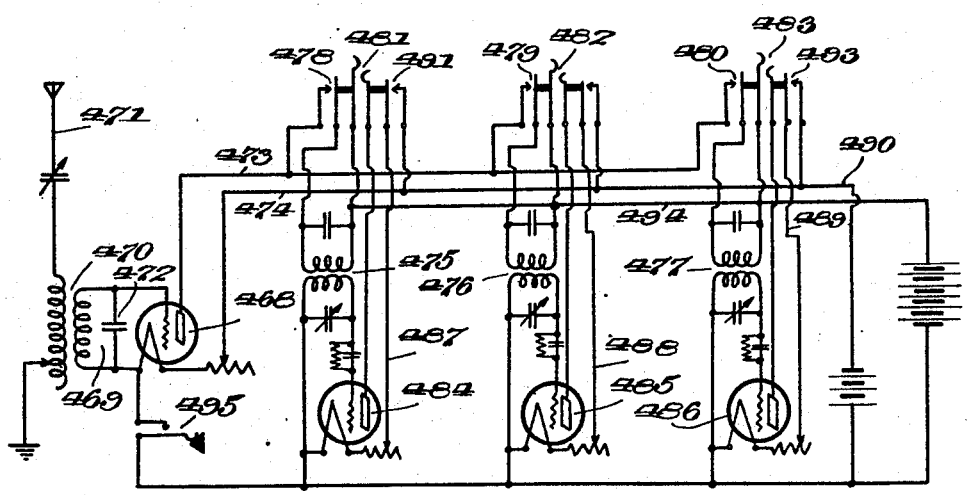
Fig. 10 is a circuit diagram of a subscriber's receiving set with fixed selective circuits.

To enable the subscribers to receive on a standard, fixed wave length and at the same time have selection of three different programs, and without the necessity of tuning, the receiving set shown in Fig. 10 is provided, which in effect is a selective, fixed tuned receiving set. This consists of a first detector tube 468 having its input circuit 469 coupled through the coupling 470 to a receiving antenna 471, the input circuit 469 being tuned to the standard fixed wave length by suitable adjustment of its electrical constants as by adjustment of the condenser 472 which, while shown in the drawing as a variable condenser may be of any suitable form capable of being given a fixed adjustment, instead of the usual wide range variable condenser. The output circuit of the detector 468 is connected to a pair of intermediate frequency bus conductors 473—474 to which the primary side of any of a set of three filter couplers 475—476—477 may be connected through different spring contacts 478—479—480 of the program jacks 481—482—483, respectively. The different filter couplers 475—476—477 are tuned respectively to the three different intermediate frequencies. Separate second detector tubes, 484—485—486 are also provided, one for each frequency with their input circuits connected permanently and individually to the primary sides of the filter couplers 475—476, respectively. Thus there is a filter coupler, program jack and detector tube for each program. The individual branches 487—488—489 of the filament circuits of the different tubes are arranged to be connected with the filament battery supply bus 490 through the spring contacts 491—492—493 of their respective program jacks. The main or central springs of each program jack are connected in circuit between plates of the detector tubes and the plus, plate battery bus 494. The filament of the first detector tube 468 is controlled through a filament switch 495.

Figures 11, 12:
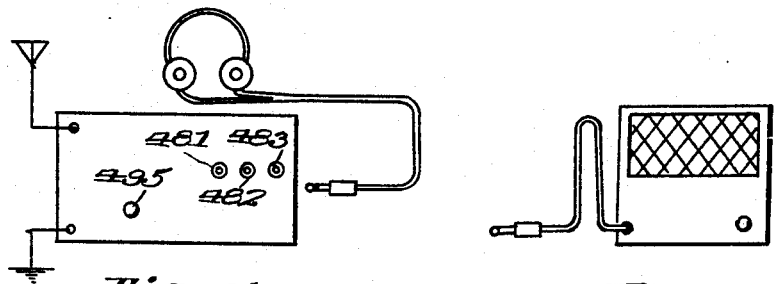
Fig. 11 is a view indicating the general outside appearance of a receiving set having the circuit of Fig. 10.
Fig. 12 is a view indicating the outside appearance of an amplifier and loud speaker unit for use with the set of Figs. 10 and 11.

In outside appearance the set of Fig. 10 will be generally as indicated in Fig. 11, that is, with no dials or other variable tuning control devices, the only apparatus elements appearing on the face of the instrument being the usual antenna and ground binding post, the control button of the filament switch 495 and the three program jacks 481—482—483. In connection with this the telephone headset 496 and cord circuit therefor terminating in a plug 497, is used, the plug 497 being arranged for engagement with any one of the program jacks so that a subscriber desiring broadcast service need only push the starting or filament control button 495 and insert the plug 497 in the program jack corresponding to the program desired. Where a loud speaker service is wanted the loud speaker unit shown in Fig. 12 may be substituted for the headset 496. This unit consists, preferably of a cabinet 498 having an opening for a loud speaker horn 499 and housing a loud speaker unit and amplifying devices not shown but which may be of any known or other suitable form arranged with the terminals and its input circuit connected with the cord and plug connection 500 for coupling to the receiver set in Fig. 11 through any of the program jacks.

Figure 13:
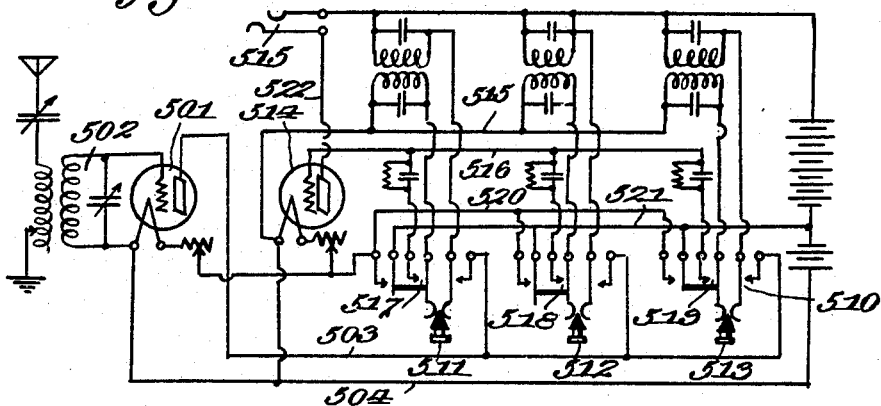
Fig. 13 is a circuit diagram of a further simplified form of the subscriber's receiving set using two tubes only.

To further simplify the subscriber's receiving set, it may be arranged as shown in Fig. 13 where only one second detector tube is used for the several different programs instead of one for each program as shown in Fig. 10. In this arrangement one jack is used and the selection of program is effected through the use of program keys, one for each program. Referring to the circuit arrangement of Fig. 13 in detail, it comprises a first detector 501 having its input circuit 502 adjusted to the standard primary frequency and its output or plate circuit connected to the intermediate frequency bus conductors 503—504 which are arranged to be connected with the primary side of any one of the filter couplers 505—506—507 through the contact 508, 509 or 510 of the corresponding program key 511, 512 or 513. The second detector tube 514 has its input or filament-grid circuit connected to the filament-grid bus conductors 515—516 to which the primary sides of the filter couplers are arranged to be connected through the contacts 517, 518 and 519 of the respective program buses. The common filament circuits of the first and second detectors is also jointly controlled by the several program keys through the extreme left hand contact of each which operates upon closure of the key to connect the common filament wire or bus 520 to the minus "A" battery bus 521. The plate lead 522 of the second detector 514 connects through the common jack 515 to the plus "B" battery bus 523. As the filter couplers 505, 506 and 507 are tuned to the three different intermediate frequencies carrying as many different programs, the user of the set shown in Fig. 3 desiring any one program, need only insert the plug of his telephone receiver or loud speaker in the jack of 515 and actuate one of the program keys 511, 512 or 513 corresponding to the program desired.

In Fig. 14 the circuit arrangement is the same as that of Fig. 13 except that each of the detector tubes is provided with a separate, individual set of "A" and "B" batteries. The batteries $A^{10}$ and $B^{10}$ are connected in the filament and plate circuits of the second detector 524 exclusively, while the batteries $A^{11}$—$B^{11}$ are connected in the filament and plate circuits of the first detector tube 525 exclusively. It will be noted that to effect the separations of battery supply the only additional wiring and apparatus connections required are the common control wires 526 and the extra contacts, one pair in each of the program keys, operable upon actuation of the key to bridge the wires 526 and close the circuit of the filament of the detector tube 525 through its individual filament battery $A^{11}$.

In Fig. 15 is shown a modification of the receiving set of Fig. 14 which is the same as that of Fig. 14 except that the fourth filter coupler 527 and program key 528 is provided for the reception of any one of a group of special programs transmitted on a group of special intermediate frequency waves, the filter coupler 527 differing from the three preceding couplers in that it is arranged to be variably tuned to any one of the different special wave lengths by the listener, which tuning may be effected in any known or suitable manner as by adjustment of the variable condenser shown. Thus for reception of one of the standard programs the subscriber has simply to actuate the program key corresponding to that program and to receive a special program the key 528 is actuated to connect the special filter coupler 527 in circuit after which it is tuned to the desired program. This provides means in the system enabling a subscriber to make request for a special program to be put on one of the special intermediate frequencies, so that special programs may be had by certain subscribers without interfering with the regular programs. These special programs would most usually be programs originating at distant stations and not of general public interest, and for such service the requesting subscriber will be charged a fee commensurate with the value of the service given.

To afford secrecy transmission from the regional distributing stations C to its subscribers, the system shown in Fig. 19 is provided which may be used in place of the arrangement of Figs. 6 and 7. This comprises, generally, an arrangement whereby an audible obscuring hum is produced by suitable connection with a source of alternating current and combined with the audio modulations transmitted so as to render the matter so transmitted unintelligible to unauthorized listeners, and means for supplying the subscribers' receiving sets with alternating current from the same source at a phase displacement of 180° to neutralize the hum at the subscriber's receiver and leave only the desired audible modulations. To prevent annoying non-subscribers who may have ordinary receivers capable of picking up or responding to the carrier waves transmitted by the regional station, the obscured signals are transmitted by a system of double modulation similar to that previously described so that the ordinary receiver not equipped with means for double demodulation or detection will not respond. Referring to the diagram of Fig. 19 in detail, the reference numeral 400 indicates a pick-up microphone supplied with current from a suitable source 401 and connected through the primary and secondary windings 402—403 of a transformer 404 to an audio modulator 405. A third winding 406 arranged in the magnetic circuit of the transformer 404 is connected in circuit with the primary winding of a bell ringing transformer 407 whose primary winding is connected through a connecting plug 108, suitably based to prevent accidental reversal of connections, to a suitable source of alternating current which in the present instance consists of a connection to the mains 409 of a 60 cycle alternating current electric power supply 410. An audible hum is thus combined with the audio modulations supplied to the modulator 405. The audio modulator 405 is connected to the input side of an intermediate frequency oscillator 411 whose modulated output is supplied to an intermediate frequency modulator 412 through which it is modulated onto the waves generated by a short wave or radiating oscillator transmitter 413 connected through coupling 414 to the transmitting antenna 415. The antenna 415 thus transmits a primary wave on which is modulated a secondary or intermediate frequency superaudio wave on which in turn is modulated the intelligible audio waves produced by the microphone 400, in combination or mixed with the audio waves or audible hum produced by the 60 cycle current in the third transformer winding 406. At D is represented one of the several subscribers' stations each of which comprises an antenna 416 and detector tube 417 having its input circuit 418 coupled to the antenna 416 and tuned to the short or primary wave transmitted from the antenna 415. The output circuit of the detector 417 is coupled to the input circuit 419 of a second detector 420 tuned to the secondary or intermediate frequency, wave and arranged to detect therefrom the audio modulations and reproduce the same in its output circuit 421 and telephone receiver 422 here shown as a pair of head-phones but which of course may be a loud speaker or other audio responsive device. To neutralize the 60 cycle hum so that only the modulations produced by the microphone 400 will be audible in the receiver 422, the known fact that a receiver whose detector filament circuit is supplied with alternating current produces a 60 cycle hum in its output circuit is taken advantage of by so supplying the filaments of the present receiver, and so connecting the same to the same source of 60 cycle alternating varying potentials tending to produce a 60 cycle hum in the receiver that it will be in opposite phase to that of the hum modulated onto the transmitter at the sending station. To this end the filament circuit 423 is connected through a transformer 424 to the 60 cycle power supply main 409, the connection with the main 409 being made through a reversing or pole-charger switch 425 to enable the filament current to be reversed in phase at will, to compensate for any reversal of connections between the sending or receiving stations and the power supply station such as might occur due to repair or alteration of the power wiring system, etc. To make the receiving station completely free of batteries, the plate circuits of the tubes used are supplied with current from the main 409 through B battery eliminators 426 and 427 which may be of any known or other suitable form. Except for the substitution of power supply from power mains for the usual A and B batteries, the receiving circuit just described is the same as the receiver for double modulation shown in the publication entitled "Principles of Radio Communication" by J. H. Morecroft, page 683. Where amplification of the intermediate frequency wave is desired, suitable amplifying means may be inserted between the two detector tubes 417—420 in the space between the dotted lines.

Fig. 20 shows another embodiment of the secrecy principle made use of in the system of Fig. 19, the present form operating independently of a common wire connection or service. This system also uses double modulation but with two secondary or intermediate frequencies instead of one, the desired audio modulations being imposed on both intermediate frequencies in phase while the obscuring hum is placed on both but in opposite phase, so that reception through one intermediate frequency will result in reproduction of both the desired modulation and the obscuring hum thus rendering the reception unintelligible. Referring in detail to the elements of this system as indicated in Fig. 20 the reference numeral 428 indicates a microphone connected in series with a suitable source of power such as the battery 429 and the primary windings of a pair of induction coils 430 and 431 whose secondary windings are separately connected to audio modulator No. 1 indicated by reference numeral 432 and audio modulator No. 2 indicated by reference numeral 433 respectively. Each of the coils 430—431 are provided with a third winding 434—435 which third windings are reversely connected through a transformer 436 to a suitable source of alternating current 437 of audible frequency. By the term of reverse connection of the coils 434—435 is indicated such connection that the electromagnetic effect of its coils or windings will have the reverse effect on the modulation in point of time that is in opposite phase relation. The modulators 432—433 are each operatively connected with intermediate frequency oscillators 438—439 labeled on the drawings as intermediate frequency oscillator No. 1 and intermediate frequency oscillator No. 2 respectively, which oscillators are connected individually through intermediate modulators 440—441 to a common short wave, oscillator transmitter 442 having its output circuit coupled through the coupling 443 with the transmitting antenna 444. In operation, sound waves acting on the microphone 428 will be electrically transferred to the No. 1 and No. 2 audio modulators in synchronism and from thence modulated onto the two different intermediate frequency waves generated by the oscillators 438 and 439 which intermediate frequency waves are in turn modulated through their respective No. 1 and No. 2 modulators onto the short wave generated by the oscillator 442. This short wave carrying both the intermediate frequency waves with their modulations is radiated out from the transmitting antenna 444 as a double modulated wave.

For relaying this double modulated wave without passing through the audio stage, the relay apparatus of Fig. 21 is provided. This consists generally of means for receiving the primary wave, demodulating the same to detect the two different intermediate frequency waves and again modulating these two waves onto another short primary wave of a frequency different from a non-interfering with the received wave. Referring more in detail to the elements constituting this system, the reference numeral of 445 indicates the receiving antenna coupled to the input circuit 446 of a first detector apparatus 447; the input circuit of which 446 is tuned to the primary wave. This detector 447 is arranged to detect out both intermediate frequency waves and put them onto its output circuit 448 which is connected as shown to two filter couplers 449 and 450 tuned, respectively, to the first and second intermediate frequency, waves. The filter couplers 449 and 450 are connected to the input terminals of the No. 1 and No. 2 intermediate frequency modulators 451 and 452 the output terminals of which connect to the input side of a short wave oscillator transmitter 453 which has its output circuit coupled through the coupler 454 to the transmitting antenna 455, the oscillator 453 being adjusted to generate the wave of a frequency different from a non-interfering with that of the received wave. Thus, in operation, the two intermediate frequency, waves, borne by the primary radiated wave are relayed onto a second primary wave transmitted from the transmitting antenna 455 without demodulation. The relay system of Fig. 21 is the same for both the intermediate or relay stations, that is the B and C stations with the exception that their oscillator transmitters are, of course, adjusted to transmit on different and non-interfering frequencies.

The subscriber's apparatus for receiving the special double modulated wave transmitted from its local C station is indicated diagrammatically in Fig. 22 in which the receiving antenna is indicated at 456 and shown coupled through a tuned coupling circuit 457 with a first detector apparatus 458. The coupling 457 and detector apparatus are tuned for detecting out both the intermediate frequency waves and passing them on through its output circuit 459 to the two differently tuned filter couplers 460 and 461 tuned first intermediate frequency and second intermediate frequency, respectively. The filter couplers 460—461 are connected to the input circuits of second detectors 462—463 whose output circuits are in turn connected to the primary coils 464 and 465 respectively, of transformer 466 the secondary winding of which includes a telephone receiver set 467 which, it is to be understood, is typical of any suitable form of telephone receiver such as a loud speaker or the like. In operation the double modulated wave received on the antenna 456 is first demodulated by the first detector 458 to detect out the two different intermediate frequency waves the first of which passes through the filter coupler 460 and the second detector 462, while the second intermediate frequency wave passes through filter coupler 461 to the second detector 463. Each of the two second detectors operates to detect out the desired audio modulations together with the obscuring hum and passes the same through its primary winding of the induction coil or transformer 466 the two primary windings being so related as to augment each other as to the desired audio modulations. As the modulations representing the obscuring hum are in opposite phase relation they will neutralize each other in the common magnetic circuit of the transformer so that only the desired modulations will be heard in the receiver 467.

It will be noted that by reversing the connections of one of the secondary windings of the transformer 466 the modulations of the two different intermediate frequency waves representing the hum will be thrown in phase while those representing the desired modulations will be thrown in opposite phase with the result that only the modulations representing the hum will be audible while those representing the sound waves picked up by the microphone at the sending station will be cancelled out or neutralized and so will not be audible. Thus, if at the sending station (Fig. 20) a second microphone is used to vary the current flow in the third windings 434 and 435 of the modulating transformers, in place of the transformer and source of alternating current 437, matter being picked up by one microphone may be used to obscure or render uintelligible the matter picked up by the other. In practice, this enables both intermediate frequencies to be usefully employed without lessening the secrecy feature. For example, the two sets of modulations may be constituted of two different program numbers in the same program, or in the case of a song or spoken part, the same item rendered in different languages. The advantage attained by this use of the system of Figs. 20, 21 and 22, is that the combination of the two frequencies is made to subserve two functions, at the same time, namely, the attainment of both secrecy and selection.

Figure 23:
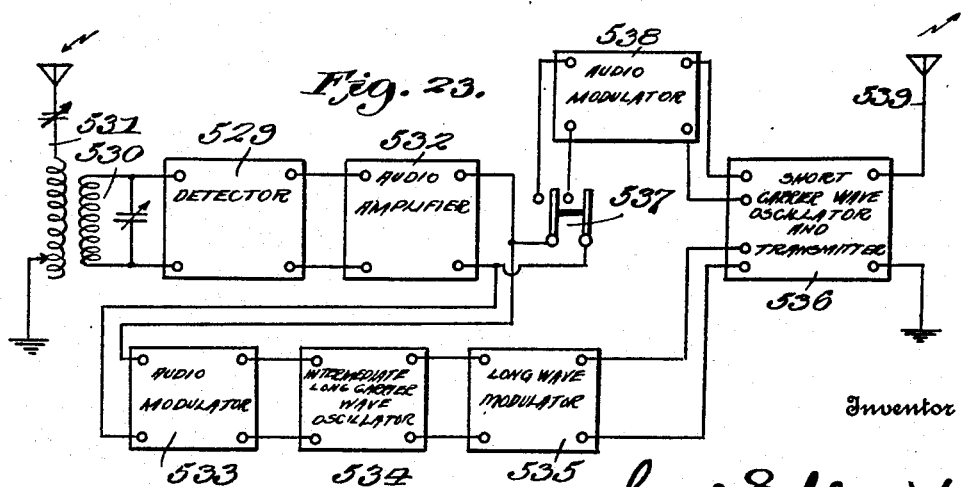
Fig. 23 is a schematic diagram of a relay circuit for combined secrecy and public broadcast service.

To supply the subscribers with special programs picked up from other stations on a single modulated wave, the relay system of Fig. 23 is provided which consists, as shown, of a detector 529 arranged with its input circuit 530 coupled to a short wave receiving antenna 531 and tuned to receive matter broadcasted on a single modulated wave. The output circuit of the detector 529 is connected to the input end of an audio amplifier 529 the amplified audio output of which is connected through an audio modulator 533 to an intermediate or long wave oscillator 534 to modulate the audio current onto the long waves produced thereby. The output end of the oscillator 534 is connected through a long wave modulator 535 to the short wave oscillator, transmitter 536, to modulate onto the short waves produced by the oscillator 536 the long waves of the oscillator 534 which are in turn modulated with the audio waves. The oscillator transmitter 536 will therefore retransmit, on a double modulated wave, matter picked up by the detector 529. By throwing the switch 537 to the left a multiple connection is made from the output circuit of the audio amplifier 532 to the audio modulator 538, the output circuit of which is connected to the short wave oscillator 536 for direct modulation of the output thereof with the audio waves. This results in the primary wave transmitted from the antenna 539 of the oscillator 536 being modulated in both the audio modulations and the superaudio or long wave modulations which in turn are modulated with the same audio modulations, so that any one with an ordinary receiver capable of receiving on the usual single modulated wave may receive the matter being thus broadcasted as well as the authorized subscribers. Thus, a program or portions of the program may be donated to the public when so desired.

I claim:

1. A broadcasting system comprising primary high power stations using different wave lengths, secondary stations having receiving radio sets tunable to the different primary wave lengths and also having relay transmitting apparatus controlled by the receiving sets and operating on a standard fixed wave length the same for all secondary transmitters and modulated with intermediate frequency carrier waves, and subscribers' receiving radio stations grouped around each secondary transmitting station in its local area and tuned permanently to the fixed transmitting wave length thereof with selective circuits tuned permanently to said intermediate frequency carrier waves.

2. A radio system of intercommunication having a plurality of standardized uniform receiving stations divided into groups, all said stations being tuned to one common frequency and of sensitiveness limited to the areas covered by their respective groups, a local transmitting station for each group working on said common wave length, and means for double modulating the waves radiated from said transmitting stations as determined by primary stations using variable wave lengths, together with double demodulating means at each of said receiving stations.

3. An organized system of broadcast distribution comprising an electrical distribution wire network, subscribers' stations connected to the network for service thereover, broadcast receiving sets at the subscribers' stations permanently tuned to a given fixed wave length, and a broadcasting station having receiving apparatus responsive to waves radiated from primary stations, and transmitting apparatus controlled by said receiving apparatus to reproduce the original signal modulations received from a primary station on a long carrier wave in the band suitable for transmission over wires, and connected to said network and arranged to transmit thereover on the given fixed frequency in said band to which said receiving sets are tuned.

4. The combination of a general organized wire signaling system comprising exchange centers with subscribers grouped around them and interconnected by trunk lines, and a general organized radio system comprising distributing centers with subscribers' receiving stations grouped in local areas around them, and interconnected by trunk channels, of means for directively transmitting a signal over the wires from any point in the combined system to another given point, and means at said second given point for distributively broadcasting the same signal uniformly through the several other distributing points or stations in said radio system.

In testimony whereof I hereunto affix my signature.

EDWARD E. CLEMENT.